(12) United States Patent
Fasse et al.

(10) Patent No.: US 8,930,125 B2
(45) Date of Patent: Jan. 6, 2015

(54) CONSISTENT RANGE CALCULATION IN HYBRID VEHICLES WITH HYBRID AND PURE BATTERY ELECTRIC PROPULSION

(75) Inventors: Martin Fasse, Selters (DE); Tomas Dehne, Wiesbaden (DE); Andreas Voigt, Neu-Isenburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 733 days.

(21) Appl. No.: 13/047,166

(22) Filed: Mar. 14, 2011

(65) Prior Publication Data

US 2012/0239283 A1 Sep. 20, 2012

(51) Int. Cl.
*B60L 3/12* (2006.01)
*B60L 11/18* (2006.01)
*B60L 7/18* (2006.01)
*B60L 11/00* (2006.01)
*B60L 11/14* (2006.01)
*B60L 11/16* (2006.01)
*G07C 5/08* (2006.01)

(52) U.S. Cl.
CPC ........... *B60L 11/1861* (2013.01); *B60L 3/0045* (2013.01); *B60L 7/18* (2013.01); *B60L 11/005* (2013.01); *B60L 11/14* (2013.01); *B60L 11/16* (2013.01); *B60L 11/1887* (2013.01); *B60L 2240/549* (2013.01); *B60L 2250/16* (2013.01); *B60L 2260/52* (2013.01); *B60L 2260/54* (2013.01); *Y02T 10/7077* (2013.01); *Y02T 10/7044* (2013.01); *Y02T 10/705* (2013.01); *Y02T 10/7022* (2013.01); *Y02T 10/7027* (2013.01); *Y02T 90/34* (2013.01); *G07C 5/0841* (2013.01)
USPC ........................................ 701/123; 180/65.21

(58) Field of Classification Search
USPC .......................................................... 701/123
See application file for complete search history.

(56) References Cited

U.S. PATENT DOCUMENTS

| | | | | | |
|---|---|---|---|---|---|
| 4,400,779 | A | * | 8/1983 | Kosuge et al. ................ | 701/123 |
| 5,301,113 | A | * | 4/1994 | To et al. ........................ | 701/123 |
| 6,467,337 | B2 | * | 10/2002 | Sadahiro et al. ............ | 73/114.54 |
| 6,725,151 | B2 | * | 4/2004 | Itou .............................. | 701/123 |
| 7,412,313 | B2 | * | 8/2008 | Isaac ........................... | 701/32.3 |
| 8,406,948 | B2 | * | 3/2013 | Wang et al. .................... | 701/22 |
| 8,504,236 | B2 | * | 8/2013 | Guo et al. .................... | 701/29.1 |
| 2010/0138142 | A1 | * | 6/2010 | Pease ........................... | 701/123 |

(Continued)

FOREIGN PATENT DOCUMENTS

| CN | 101424558 A | 5/2009 |
|---|---|---|
| CN | 101879866 A | 11/2010 |

(Continued)

*Primary Examiner* — Shelley Chen
(74) *Attorney, Agent, or Firm* — John A. Miller; Miller IP Group, PLC

(57) ABSTRACT

A system and method for determining fuel consumption and travel range of an electric hybrid vehicle, such as an electric hybrid fuel cell vehicle. The method includes converting the output current of a battery to a virtual consumed fuel consumption flow value and then adding the virtual consumed fuel consumption flow value to an actual consumed fuel value to get a total consumed fuel value that is then divided by the travelled distance of the vehicle to get the fuel consumption of the vehicle. The method also includes converting the SOC of the battery to a virtual available fuel value and then adding the virtual available fuel value to an actual available fuel value to get a total available fuel value that is then divided by the fuel consumption to get the travel range of the vehicle.

16 Claims, 1 Drawing Sheet

(56) References Cited

U.S. PATENT DOCUMENTS

| | | | |
|---|---|---|---|
| 2011/0046834 A1* | 2/2011 | Grider et al. | 701/22 |
| 2011/0276260 A1* | 11/2011 | Sim | 701/123 |
| 2012/0116620 A1* | 5/2012 | Wang et al. | 701/22 |
| 2013/0090792 A1* | 4/2013 | Eom et al. | 701/22 |

FOREIGN PATENT DOCUMENTS

| | | | | |
|---|---|---|---|---|
| JP | 2004-63205 A | | 2/2004 | |
| JP | 2004063205 A | * | 2/2004 | ............ H01M 8/04 |
| WO | WO 2011019240 A2 | * | 2/2011 | |

\* cited by examiner

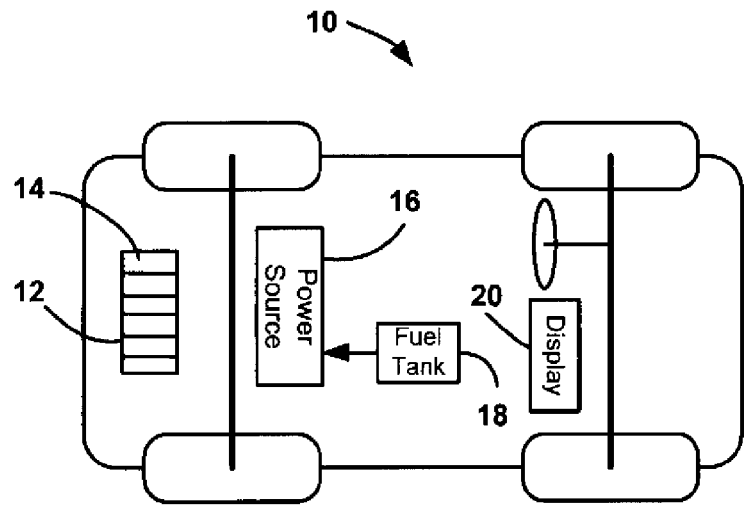
FIGURE 1
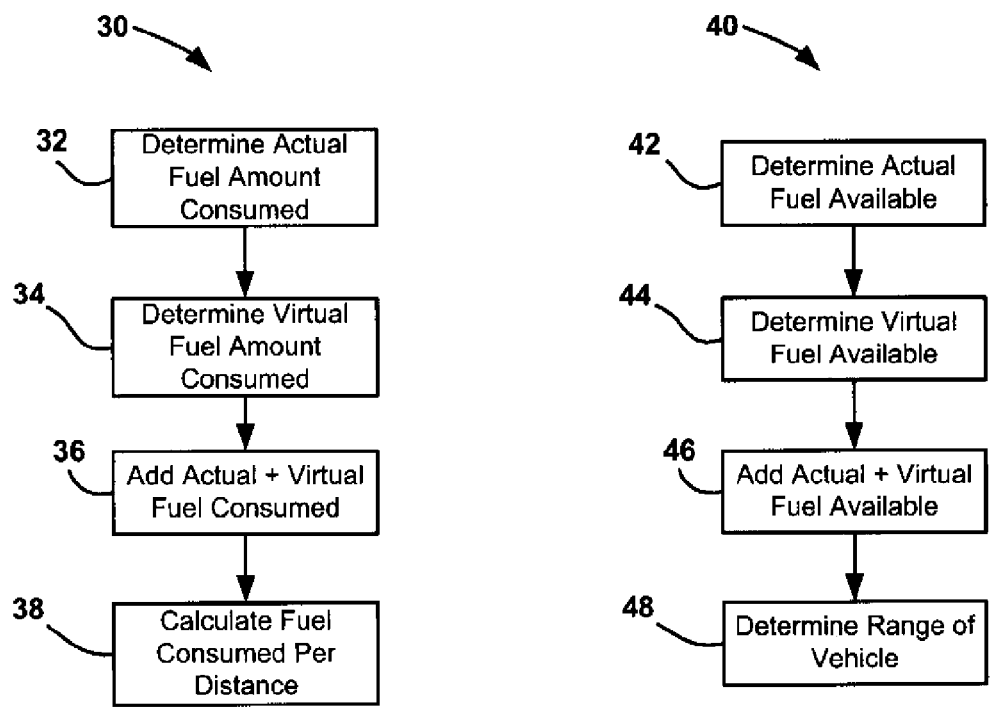
FIGURE 2  FIGURE 3

CONSISTENT RANGE CALCULATION IN HYBRID VEHICLES WITH HYBRID AND PURE BATTERY ELECTRIC PROPULSION

BACKGROUND OF THE INVENTION

1. Field of the Invention

This invention relates generally to a system and method for determining the travel range and fuel consumption of a vehicle and, more particularly, to a system and method for determining the travel range and fuel consumption of an electric hybrid vehicle, such as a fuel cell hybrid vehicle, where the method includes converting the current and state-of-charge (SOC) of an electrical storage device, such as a battery, on the vehicle to a virtual fuel flow and virtual available fuel, respectively, that are included as part of the calculation to determine the fuel consumption and travel range, respectively.

2. Discussion of the Related Art

Electric vehicles are becoming more and more prevalent. These vehicles include hybrid vehicles, such as the extended range electric vehicles (EREV), that combine a battery and a main power source, such as an internal combustion engine, fuel cell systems, etc., and electric only vehicles, such as the battery electric vehicles (BEV). All of these types of electric vehicles employ a high voltage battery that includes a number of battery cells. These batteries can be different battery types, such as lithium-ion, nickel metal hydride, lead-acid, etc. A typical high voltage battery system for an electric vehicle may include a large number of battery cells or modules including several battery cells to meet the vehicle power and energy requirements. The battery system can include individual battery modules where each battery module may include a certain number of battery cells, such as twelve cells. The individual battery cells may be electrically coupled in series, or a series of cells may be electrically coupled in parallel, where a number of cells in the module are connected in series and each module is electrically coupled to the other modules in parallel. Different vehicle designs include different battery designs that employ various trade-offs and advantages for a particular application.

Electric hybrid vehicles typically provide a display for the vehicle driver that shows the amount of fuel that is currently being consumed and the travel range of the vehicle based on the remaining fuel. For example, in a fuel cell electric vehicle including a fuel cell stack and a battery, the fuel consumption and range of the vehicle is determined by the amount of hydrogen gas fuel that has been used by the stack and the remaining hydrogen fuel stored in hydrogen pressure tanks on the vehicle.

The propulsion power for the vehicle may be provided by the fuel cell stack only, a combination of the fuel cell stack and the battery, or the battery only. For those times when the electrical power is being provided by the battery, either partially or fully, less hydrogen fuel is used to propel the vehicle a certain distance than would otherwise be used if the fuel cell stack alone was providing all of the propulsion power. Therefore, vehicle range calculations based on hydrogen fuel consumption would be inaccurate during those times when the battery power is being used to propel the vehicle.

Further, after the battery has been used to provide electric power to propel the vehicle, or otherwise, fuel cell stack power is used at the appropriate time to provide the power necessary to recharge the battery. For those times when the fuel cell stack is being used to provide electrical power to propel the vehicle and to charge the battery, the amount of hydrogen fuel consumption is substantially higher than would be required to provide the electrical propulsion only so that again the distance that the vehicle can travel based on hydrogen fuel consumption is inaccurate. Because the control system is continually changing the percentage of power provided between fuel cell stack and the battery to provide efficient operation of the vehicle, there is a large degree of oscillation between whether hydrogen fuel consumption provides too long of a distance or too short of a distance for an accurate vehicle range.

SUMMARY OF THE INVENTION

In accordance with the teachings of the present invention, a system and method are disclosed for determining fuel consumption and travel range of an electric hybrid vehicle, such as an electric hybrid fuel cell vehicle. The method includes determining an actual consumed fuel value that identifies how much actual fuel is being used by a main power source and a virtual consumed fuel flow value that is a function of an output current of a rechargeable electric energy source. The method adds the actual consumed fuel value and the virtual consumed fuel flow value to get a total consumed fuel value. The method divides the total consumed fuel value by a distance the vehicle has travelled to get a fuel consumption value that identifies the amount of fuel consumed by the vehicle. The method also determines an actual available fuel value of how much actual fuel is on the vehicle and a virtual available fuel value as a function of the state-of-charge of the rechargeable electric energy source. The method adds the actual available fuel value and the virtual available fuel value to get a total available fuel value and divides the total available fuel value by the fuel consumption value to get the travel range of the vehicle.

Additional features of the present invention will become apparent from the following description and appended claims, taken in conjunction with the accompanying drawings.

BRIEF DESCRIPTION OF THE DRAWINGS

FIG. 1 is a simple plan view of an electric hybrid vehicle;

FIG. 2 is a flow chart diagram showing a method for determining fuel consumption for an electric hybrid vehicle; and FIG. 3 is a flow chart diagram showing a method for determining vehicle travel range for an electric hybrid vehicle based on the fuel consumption.

DETAILED DESCRIPTION OF THE EMBODIMENTS

The following discussion of the embodiments of the invention directed to a system and method for determining fuel consumption and travel range of an electric fuel cell vehicle is merely exemplary in nature, and is in no way intended to limit the invention or its applications or uses. For example, this discussion is directed to a fuel cell hybrid vehicle including a fuel cell stack and a battery. However, as well be appreciated by those skilled in the art, the system and method for determining fuel consumption and travel range may have application for other electric vehicles that include other power sources, such as an internal combustion engine, and other electrical energy sources, such as super capacitors, fly wheels, etc.

FIG. 1 is a top plan view of a vehicle 10 intended to generally represent an electric hybrid vehicle. The vehicle 10 includes a high voltage battery 12 mounted within the vehicle 10, where the battery 12 includes a plurality of battery cells 14. The battery 12 can be any battery suitable for an electric vehicle, such as a lead-acid battery, lithium-ion battery, metal hydride battery, etc. The vehicle 10 also includes a main power source 16, such as an internal combustion engine, fuel cell stack, etc. The vehicle 10 also includes a storage tank 18 that stores fuel for the power source 16, such as a hydrogen tank for storing compressed hydrogen gas for a fuel cell stack. A display 20 is provided on the vehicle 10 for displaying the fuel consumption and the travel range of the vehicle 10 as determined below.

The present invention proposes a system and method for determining the amount of fuel consumed by a hybrid vehicle and the travel range of the vehicle for the remaining fuel. As mentioned above, although the discussion herein is directed to a fuel cell hybrid vehicle including a fuel cell stack and a battery, the present invention will have application to other electric vehicles, such as vehicles including internal combustion engines, and other rechargeable electrical energy storage (RESS) devices, such as super capacitors, fly wheels, etc.

As will be discussed in detail below, the method of the invention includes converting the output current of the battery 12 to a virtual consumed fuel flow value and then adding the virtual consumed fuel flow value to an actual consumed fuel value to get a modified or total consumed fuel value that is then divided by the distance travelled by the vehicle 10 for a certain period of time to get the fuel consumption of the vehicle 10. More particularly, the fuel consumption is determined from the consumed fuel since a last reset of the fuel consumption calculation divided by the driven distance of the vehicle since the last reset of the fuel consumption calculation, where the consumed fuel is determined by integrating the fuel flow. A reset of the fuel consumption calculation is initiated by the driver. The method also includes converting the SOC of the battery to a virtual available fuel value and then adding the virtual available fuel value to an actual available fuel value to get a total available fuel value that is then divided by the fuel consumption to get the travel range of the vehicle 10.

FIG. 2 is a flow chart diagram 30 showing a process for calculating a fuel consumption value that includes the virtual consumed fuel flow value based on battery current. At box 32, the actual consumed fuel value representing the fuel that has been consumed by the fuel cell stack 16 is determined, which is based on known algorithms and models that monitor hydrogen gas flow to the fuel cell stack 16, the storage capacity of the storage tank 18, etc. At box 34, the virtual consumed fuel flow value is determined, which represents the fuel flow that is attributed to the charging and discharging of the RESS, i.e., the battery 12, over a certain time period. Particularly, charging the battery 12 provides a negative virtual consumed fuel flow because the fuel cell stack 16 is being used to provide the power to charge the battery 12, which consumes more hydrogen gas in addition to the hydrogen gas being used for vehicle propulsion. Discharging the battery 12 provides a positive virtual consumed fuel flow because battery power is being used to propel the vehicle 10, which otherwise would have been provided by the fuel cell stack 16.

One non-limiting process for determining the virtual consumed fuel value based on the charging and discharging of the battery 12 can be calculated as follows.

Virtual Fuel Flow=Battery Current×Battery Voltage/120,000/FCPS Eff.

FCPS is the fuel cell power system and the measured HV battery current has to be reduced by the current that is produced by the electric traction system during regenerative braking situations.

At box 36, the total consumed fuel value is determined, which is calculated by adding the actual consumed fuel value and the virtual consumed fuel flow value. At box 38, the fuel consumption value is calculated, which is the total consumed fuel value divided by the distance the vehicle 10 has travelled over the particular time period.

FIG. 3 is a flow chart diagram 40 that shows a process for determining the travel range of the vehicle 10 based on the fuel consumption value determined above. At box 42, the algorithm determines the actual available fuel in the storage tank 18 on the vehicle 10, which is based on how much hydrogen gas has been put into the tank 18 and how much hydrogen gas has been removed from the tank 18 using known processes and techniques. At box 44, the algorithm determines the virtual available fuel value, which is a function of the SOC of the battery 12, where the battery 12 can only be discharged to a certain percentage of SOC.

The virtual available fuel value based on the battery SOC can be determined as follows.

Virtual Available Fuel=(Battery SOC−Lower SOC Limit)(0.00048/FCPS Eff.)

At box 46, the algorithm determines the total available fuel which is the actual available fuel plus the virtual available fuel that has already been determined. At box 48, the algorithm then determines the range of the vehicle 10, which is the total available fuel divided by the fuel consumption value as determined above.

The process described above can include damping the fuel consumption and range signals using very slow low pass filters. This will reduce, but not eliminate, the variations and will also slow down the fuel range calculation.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining fuel consumption and travel range of an electric hybrid vehicle, said vehicle including a main power source and a rechargeable electric energy source, said method comprising:
   determining an actual consumed fuel value that identifies how much actual fuel is being used by the main power source;
   determining a virtual consumed fuel flow value that is a function of a measured output current of the rechargeable electric energy source, using the equation: Virtual Fuel Flow=Battery Current×Battery Voltage/120,000/FCPS Efficiency, where FCPS is fuel cell power system, and where Battery Current is the measured output current of the rechargeable electric energy source and is adjusted by a current that is produced by an electric traction system during regenerative braking;
   determining a total consumed fuel value by adding the actual consumed fuel value and the virtual consumed fuel flow value;
   determining a fuel consumption value identifying the fuel consumed by the vehicle by dividing the total consumed fuel value by a distance the vehicle has travelled;
   determining an actual available fuel value of how much actual fuel is available on the vehicle;
   determining a virtual available fuel value as a function of the state-of-charge of the rechargeable electric energy source;

adding the actual available fuel value and the virtual available fuel value to get a total available fuel value; and dividing the total available fuel value by the fuel consumption value to get the travel range of the vehicle.

2. The method according to claim 1 wherein determining a fuel consumption value includes determining the fuel consumption value from a reset of a fuel consumption calculation divided by the distance the vehicle has travelled since the reset of the fuel consumption calculation, where the fuel consumption value is determined by integrating a fuel flow.

3. The method according to claim 1 wherein determining a virtual available fuel value uses the equation: Virtual Available Fuel=(Battery SOC−Lower SOC Limit)(0.00048/FCPS Efficiency), where SOC is State-of-charge and FCPS is fuel cell power system.

4. The method according to claim 1 wherein the main power source is a fuel cell stack.

5. The method according to claim 1 wherein the main power source is an internal combustion engine.

6. The method according to claim 1 wherein the rechargeable electric energy source is a battery.

7. A method for determining fuel consumption of an electric hybrid vehicle, said vehicle including a main power source and a rechargeable electric energy source, said method comprising:

determining an actual consumed fuel value that identifies how much actual fuel is being used by the main power source;

determining a virtual consumed fuel flow value that is a function of a measured output current of the rechargeable electric energy source, using the equation:

Virtual Fuel Flow=Battery Current×Battery Voltage/120,000/FCPS Efficiency, where FCPS is fuel cell power system, and where Battery Current is the measured output current of the rechargeable electric energy source and is adiusted by a current that is produced by an electric traction system during regenerative braking;

determining a total consumed fuel value by adding the actual consumed fuel value and the virtual consumed fuel flow value; and determining a fuel consumption value identifying the fuel consumed by the vehicle by dividing the total consumed fuel value by a distance the vehicle has travelled.

8. The method according to claim 7 wherein determining a fuel consumption value includes determining the fuel consumption value from a reset of a fuel consumption calculation divided by the distance the vehicle has travelled since the reset of the fuel consumption calculation, where the fuel consumption value is determined by integrating a fuel flow.

9. The method according to claim 7 wherein the main power source is a fuel cell stack.

10. The method according to claim 7 wherein the main power source is an internal combustion engine.

11. The method according to claim 7 wherein the rechargeable electric energy source is a battery.

12. A method for determining a travel range of an electric hybrid vehicle, said vehicle including a main power source and a rechargeable electric energy source, said method comprising:

determining an actual available fuel value of how much actual fuel is available on the vehicle;

determining a virtual available fuel value as a function of the state-of-charge of the rechargeable electric energy source;

determining a total available fuel value by adding the actual available fuel value and the virtual available fuel value; and determining the travel range of the vehicle by dividing the total available fuel value by a fuel consumption value, where the fuel consumption value is provided from a reset of a fuel consumption calculation divided by the distance the vehicle has travelled since the reset of the fuel consumption calculation, where the fuel consumption value is determined by adding an actual consumed fuel value and a virtual consumed fuel value, where the virtual consumed fuel value is determined using the equation Virtual Fuel Flow=Battery Current×Battery Voltage/120,000/FCPS Efficiency, where FCPS is fuel cell power system and where Battery Current is the measured output current of the rechargeable electric enemy source which is adiusted by a current that is produced by an electric traction system during regenerative braking.

13. The method according to claim 12 wherein determining a virtual available fuel value uses the equation: Virtual Available Fuel=(Battery SOC−Lower SOC Limit)(0.00048/FCPS Efficiency), where SOC is State-of-charge and FCPS is fuel cell power system.

14. The method according to claim 12 wherein the main power source is a fuel cell stack.

15. The method according to claim 12 wherein the main power source is an internal combustion engine.

16. The method according to claim 12 wherein the rechargeable electric energy source is a battery.

* * * * *